United States Patent [19]

Miyashita

[11] Patent Number: 4,819,158
[45] Date of Patent: Apr. 4, 1989

[54] MICROPROCESSOR WITH AN INTERRUPTABLE BUS CYCLE

[75] Inventor: Takumi Miyashita, Tokyo, Japan

[73] Assignee: Fujitsu Limited, Kanagawa, Japan

[21] Appl. No.: 739,338

[22] Filed: May 30, 1985

[30] Foreign Application Priority Data

May 31, 1984 [JP] Japan .................................. 59-109477

[51] Int. Cl.⁴ ............................................. G06F 1/00
[52] U.S. Cl. .................................................. 364/200
[58] Field of Search ... 364/200 MS File, 900 MS File

[56] References Cited

U.S. PATENT DOCUMENTS

| 4,112,490 | 9/1978 | Pohlman et al. | 364/200 |
|---|---|---|---|
| 4,240,138 | 12/1980 | Chauvel | 364/200 |
| 4,458,313 | 7/1984 | Suzuki et al. | 364/200 |
| 4,488,228 | 12/1984 | Crudele et al. | 364/200 |
| 4,602,327 | 7/1986 | LaViolette | 364/200 |
| 4,720,811 | 1/1988 | Yamaguchi et al. | 364/900 |

Primary Examiner—Gareth D. Shaw
Assistant Examiner—Paul Kulik
Attorney, Agent, or Firm—Armstrong, Nikaido, Marmelstein & Kubovcik

[57] ABSTRACT

In a semiconductor integrated circuit, an internal logic circuit outputs information for an external bus via buffer circuits. The output of the buffer circuit is placed in a high impedance state by responding to a control signal, and the information which is output from the internal logic circuit to the buffer circuits is held in the bus cycle during which the control signal is input. In the response to a release of the control signal by the input of the control signal, the interrupted bus cycle is released, and the information stored is output via the buffer circuit to the external bus.

7 Claims, 15 Drawing Sheets

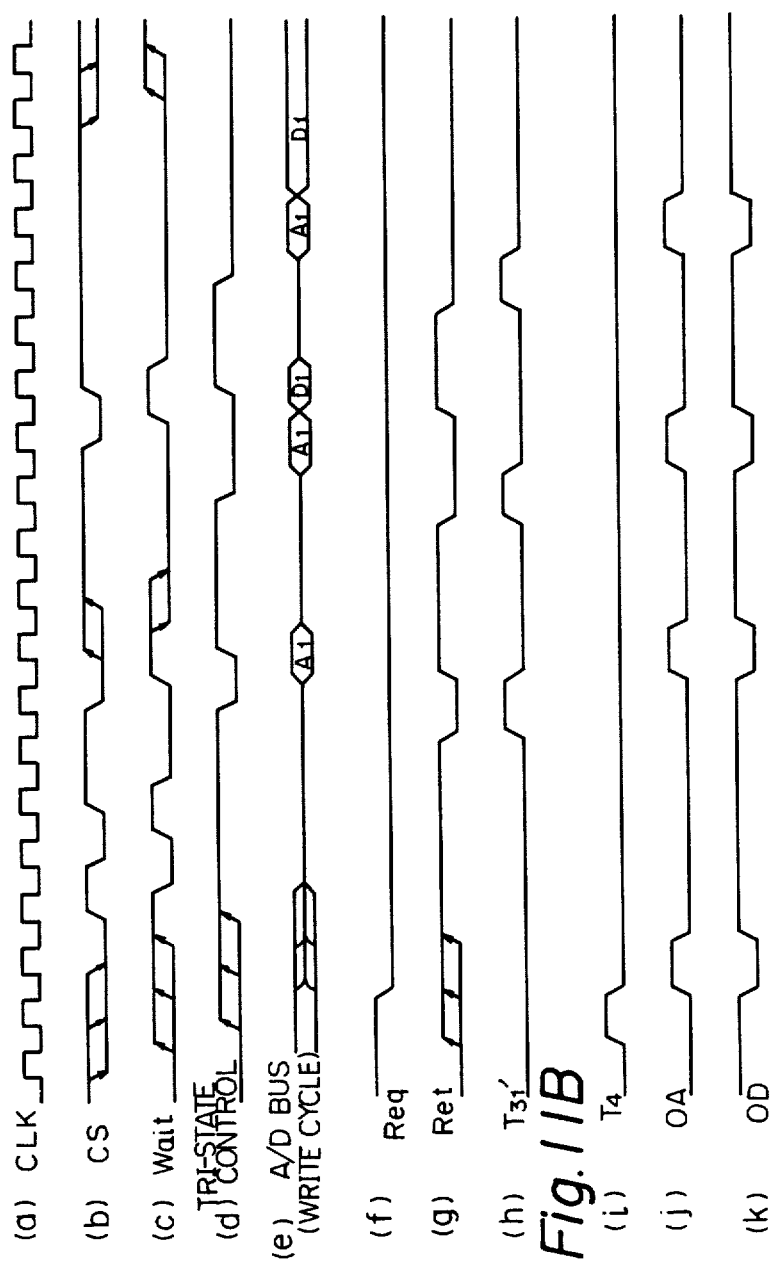

1

MICROPROCESSOR WITH AN INTERRUPTABLE BUS CYCLE

BACKGROUND OF THE INVENTION

1. Field of the Invention

A present invention relates to a semiconductor integrated circuit. More particularly, it relates to a semiconductor integrated circuit wherein a microprocessor/microcomputer are formed on a same substrate, and wherein a plurality of microprocessors exchange bus access rights to a common bus.

2. Description of the Related Art

In a conventional system such as the above, when each microprocessor exchanges bus access rights, a hold function is used. For this purpose, the microprocessor requires a handshaking function, such as hold ⇌ hold acknowledge, or, request ⇌ request grant, and a logic circuit for achieving such a handshaking function. Further, the device issuing a hold request or a bus-request must wait until the microprocessor receiving the request no longer requires access to the bus. This delay is an obstacle to carrying out an easy and rapid exchange of bus access rights or direct memory access (DMA).

SUMMARY OF THE INVENTION

An object of the present invention is to provide a semiconductor integrated circuit forming a microprocessor on the same substrate in such a manner that an exchange of the bus access right or direct memory access for the microprocessor can be carried out easily and rapidly.

The above-mentioned object can be achieved by providing a semiconductor integrated circuit comprising an internal logic circuit which outputs information for an external bus via buffer circuits; a means for placing the output of the buffer circuit in a high impedance state in response to a control signal; a holding means for holding the information output from the internal logic circuit to the buffer circuits, during the bus cycle in which the control signal is input; and a means for resuming, in response to release of the control signal by the input of the control signal, the interrupted bus cycle, and outputting the information stored in the holding means via the buffer circuit to the external bus.

Further features and advantages of the present invention will be apparent from the ensuing description with reference to the accompanying drawings, to which, however, the scope of the invention is in no way limited.

BRIEF DESCRIPTION OF THE DRAWINGS

FIGS. 11A and 11B are timing charts measured in the system of the present invention.

DESCRIPTION OF THE PREFERRED EMBODIMENTS

Figure 1:
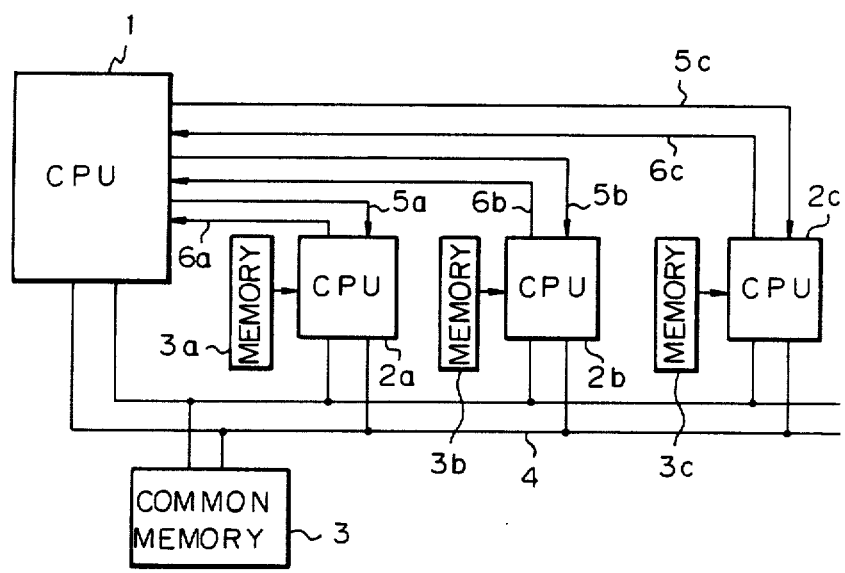
FIG. 1 is a block diagram of the system to which the present invention is applied.

FIG. 1 is a block diagram of a conventional system which provides a plurality of microprocessors exchanging bus access rights with each other, to which the present invention is applied. In FIG. 1, 1 designates a microprocessor which outputs the bus access rights, $2a$, $2b$, and $2c$ are first, second, and third microprocessors, respectively, which receive the bus access right commands output by the microprocessor 1, 3 designates a common memory, $3a$, $3b$, and $3c$ are partial memories attached to the microprocessors $2a$, $2b$, and $2c$ respectively, 4 is a common bus, $6a$, $6b$, and $6c$ bus access requests, and $5a$, $5b$, and $5c$ are affirmative acknowledgements for the requests.

Figure 2A:
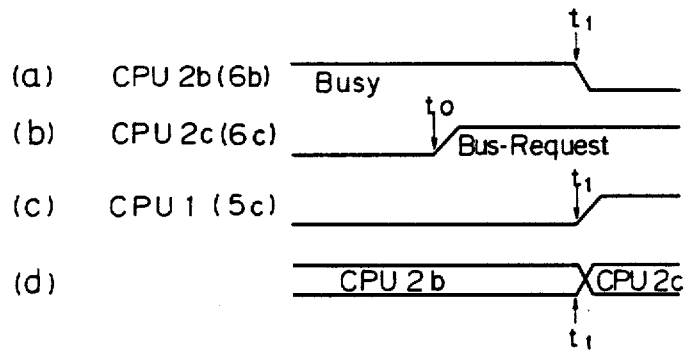
FIGS. 2A and 2B are time charts for explaining the operation of the system shown in FIG. 1.

FIG. 2A shows diagrams of the operation of the conventional system shown in FIG. 1. In FIG. 2A, (a) shows a bus request signal $6b$ of the CPU $2b$, (b) shows a bus request signal $6c$ of the CPU $2c$, (c) shows an acknowledge signal of CPU 1 for CPU $2c$, and (d) shows a change of the bus access right. In FIG. 2A, CPU $2c$ requires the use of the bus 4 for CPU 1 at the time $t_0$ during the bus cycle of CPU $2b$ as shown in (b), however, CPU $2b$ is using a bus at the time $t_0$ as shown in (a), and thus CPU 1 does not issue the acknowledge signal to CPU $2c$ as shown in (c). At the time $t_1$, the bus cycle of CPU $2b$ is completed and the bus request is released, CPU 1 detects the same and outputs the acknowledge signal for the bus request of CPU $2b$. As a result, the bus access right is given to CPU $2c$ at the time $t_1$ as shown in (c). Therefore, if the CPU $2c$ has a higher priority than CPU $2b$, as long as the bus cycle of CPU $2b$ is not completed at time $t_1$, the bus access right is not given to CPU $2c$, and the CPU $2c$ must await the completion of the bus cycle of CPU $2b$ during the time from $t_0$ to $t_1$.

Therefore, when the CPU having a high priority issues a request for use of the bus, the bus access right is immediately given to the CPU having high priority. However, in the system using a conventional microprocessor, if the bus access right is forcibly removed before the bus cycle of another CPU is completed, the following problem occurs.

As shown in FIG. 2A, in the conventional system, when each microprocessor exchanges the bus access right, a hold function is conventionally used. The microprocessor then requires a handshake function, such as hold ⇌ hold acknowledge, or, request ⇌ request grant, and a logic circuit for achieving this handshake function. Further, the device issuing the hold request or a bus-request must wait until the microprocessor receiving the bus-request no longer requires access to the bus. This delay becomes an obstacle to carrying out an easy and rapid exchange of the bus access right or a direct memory access (DMA).

Figure 3A:
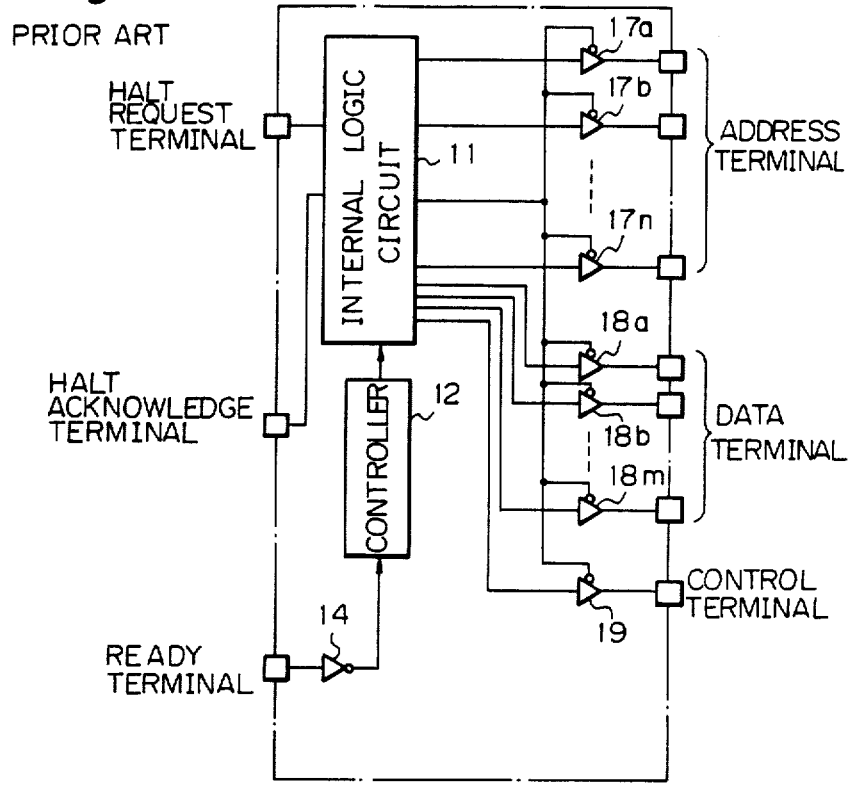
FIGS. 3A and 3B are diagrams showing one example of, and a chart-for explaining, the conventional system.
Figure 3B:
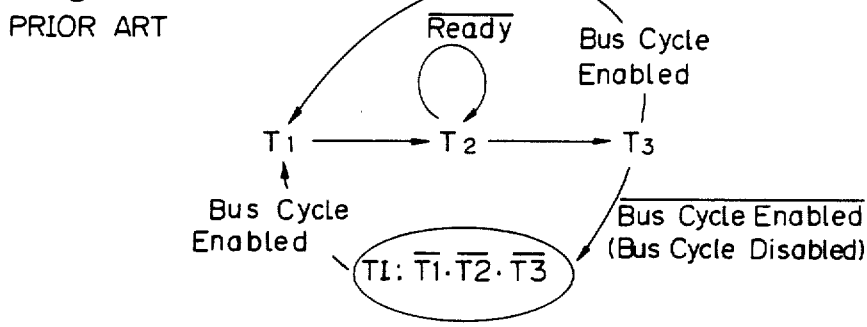

FIG. 3A is a block diagram of the microprocessor. In FIG. 3, 11 is an internal logic circuit, 12 is a controller, 14 is an inverter, and $17a \sim 17n$, $18a \sim 18m$ and 19 are tristate output buffer circuits. FIG. 3B is a chart for explaining the operation of the microprocessor shown in FIG. 3A.

A bus cycle of the microprocessor of FIG. 3A includes three fundamental cycles $T_1$, $T_2$, $T_3$, as shown in FIG. 3B. In the cycle $T_1$, the address information is output. In the cycle $T_2$, the value of the program counter (the value of the address output by $T_1$) is incremented (the address for outputting in the next bus cycle is calculated). In the cycle $T_3$, the data is read or written.

If the fundamental cycle is completed at $T_3$, and the next bus cycle can be executed, the next bus cycle is started from $T_1$. On the other hand, when the bus cycle is completed at $T_3$, and the next bus cycle can not be executed (the bus can not be used), the cycle is transferred to the idle cycle $T_I$. In the drawing, $T_I\cdot\overline{T_1}\cdot\overline{T_2}\cdot\overline{T_3}$ means that this cycle is not any of $T_1$, $T_2$, $T_3$. The mark "." signifies the AND logic. In the idle cycle $T_I$, the output of the three state buffers $17 \sim 19$ reaches a high impedance, and the bus is released to the other device. When the bus cycle is enabled during the idle cycle $T_I$, the cycle is changed to $T_1$.

When the ready signal is input to the ready terminal, the bus cycle is looped at $T_2$. At this time, the bus is not released. This ready signal is used for awaiting the completion of the access when the access time of the memory is large.

In such a conventional microprocessor, when the bus access right is forcibly given to the other microprocessor during the bus cycle, the following problem occurs.

For example, the case in which the bus access right is removed at $T_2$ is considered. At $T_2$, the address is output to $17a \sim 17n$, and the address which is to be output next is counted in the program counter. Therefore, if the bus cycle is restarted from $T_2$ by again obtaining the bus access right, the address information before the bus access right is removed is already lost (that is, the next output address is set in the program counter). Therefore, the bus cycle executed immediately before the bus access right is removed is not completed, and the read or write of one piece of data is not performed.

On the other hand, if the halt signal is supplied to a halt terminal, the change of the bus access right can be carried out without affecting the internal state of the microprocessor.

However, the time at which the outputs of 17 to 19 reach a high impedance in response to the halt signal (the acknowledge signal is issued from the halt acknowledge terminal) is after the bus cycle is completed at $T_3$. Therefore, the other processor must wait until the time at which the bus cycle of the processor shown in FIG. 3A is completed.

The present invention is intended to solve the above-mentioned problem. The basic idea of the present invention is clearly shown in FIG. 2B.

Figure 2B:
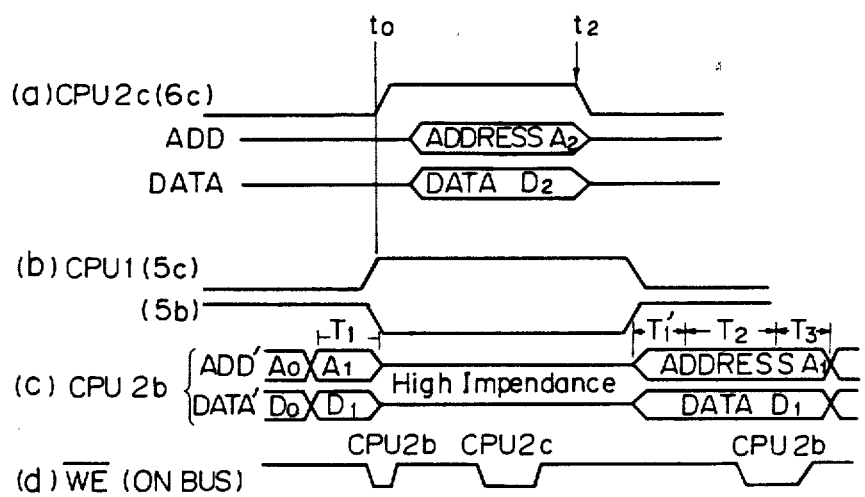

FIG. 2B shows diagrams for explaining the operation of the system shown in FIG. 1 according to the present invention. In FIG. 2B, (a) shows a bus request signal ($6c$) of the CPU $2c$, an output address ADD of the CPU $2c$, and an output data DATA of the CPU $2c$, (b) shows an acknowledge signal $5c$ output from the CPU 1 to the CPU $2c$ and an acknowledge signal $5b$ output from the CPU 1 to the CPU $2b$, (c) shows an output address ADD' of the CPU $2b$ and an output data DATA' of the CPU $2b$, and (d) shows a write enable signal $\overline{WE}$ on the common bus 4 in which $\overline{WE}$="H" signifies a read operation and $\overline{WE}$="L" signifies a write operation.

The following is an explanation of the relationships between (a)$\sim$(d). At the time $t_0$, CPU $2b$, outputs a bus request $6c$. At this time, the bus cycle of CPU $2b$ is not completed, and CPU $2b$ intends to write the data $D_1$ for $A_1$. In the present invention, different from the conventional method, even if the bus cycle of CPU $2b$ is not completed at the time $t_0$, the CPU 1 releases the acknowledge signal $5b$ for the CPU $2b$. Therefore, even if the address data terminal of the CPU $2b$ is still in the bus cycle, the CPU 1 releases the acknowledge signal $5b$ for the CPU $2b$. Therefore, the address data output terminal of the CPU $2b$ is placed in a high impedance state, although it is still in the bus cycle.

On the other hand, for the CPU $2c$, the acknowledge signal $5c$ output from the CPU 21 in immediate response to the bus request of the CPU $2c$, so that the bus access right is transferred from CPU $2b$ to CPU $2c$. When CPU $2c$ writes the data $D_2$ in address $A_2$, the bus access request $6c$ is released at the time $t_1$. Consequently, the bus access right is again given to CPU $2b$. In this case, if one bus cycle of a CPU is formed with three basic cycles $T_1 \sim T_3$ mentioned above, the bus access right of CPU $2b$ is forcibly removed during the execution of $T_1$. Therefore, if the bus access right is given to CPU $2b$ at time $t_2$, the data $D_1$ and the address $A_1$ are not output because basic cycle $t_1$ is already finished. Therefore, in the present invention, means are provided for holding the address $A_1$ and the data $D_1$ during the time from $t_0$ to $t_2$, and means for restarting the bus cycle by using the address $A_1$ and the data $D_1$ held at the time $t_2$. In FIG. 2B, $T'_1$ shows the basic cycle using the held address $A_1$ and the held data $D_1$.

Figure 4A:
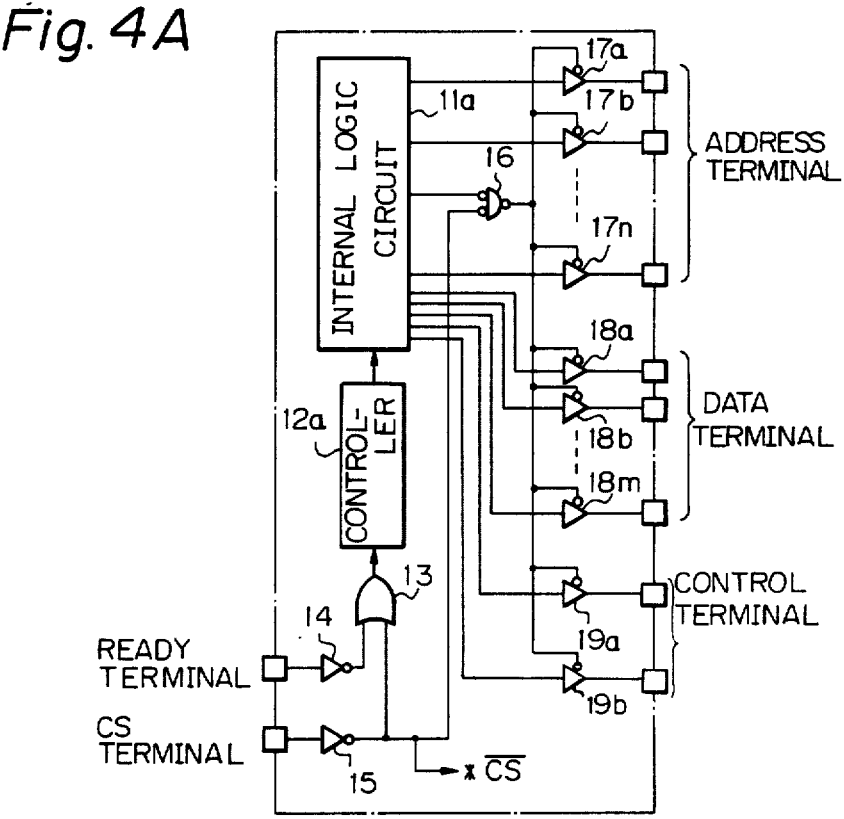
FIG. 4A is a block diagram showing a first embodiment of the present invention.

FIG. 4A shows a block diagram of the first embodiment of the present invention. In FIG. 4A, $11a$ is an internal logic circuit (CPC), $12a$ is a control circuit, 13 is a gate, 14 and 15 are inverters, 16 is a gate, and $17a \sim 17n$, $18a \sim 18m$, and $19a$, $19b$ are tristate output buffer circuits. In FIG. 4A the characteristic feature of the present invention is shown wherein a CS terminal is provided which inputs a CS signal (chip select signal). When the CS signal is input, the output states of the tristate output circuits $17a \sim 17n$, $18a \sim 18m$, and $19a$, $19b$, are, via the gate, forcibly rendered to a high impedance state regardless of the processing state in the internal logic circuit $11a$.

Figure 4C:
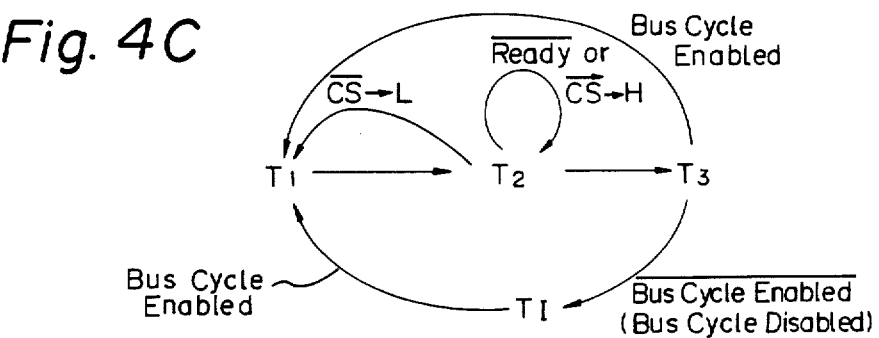
FIG. 4C is a chart for explaining the first embodiment of the present invention.
Figure 4B:
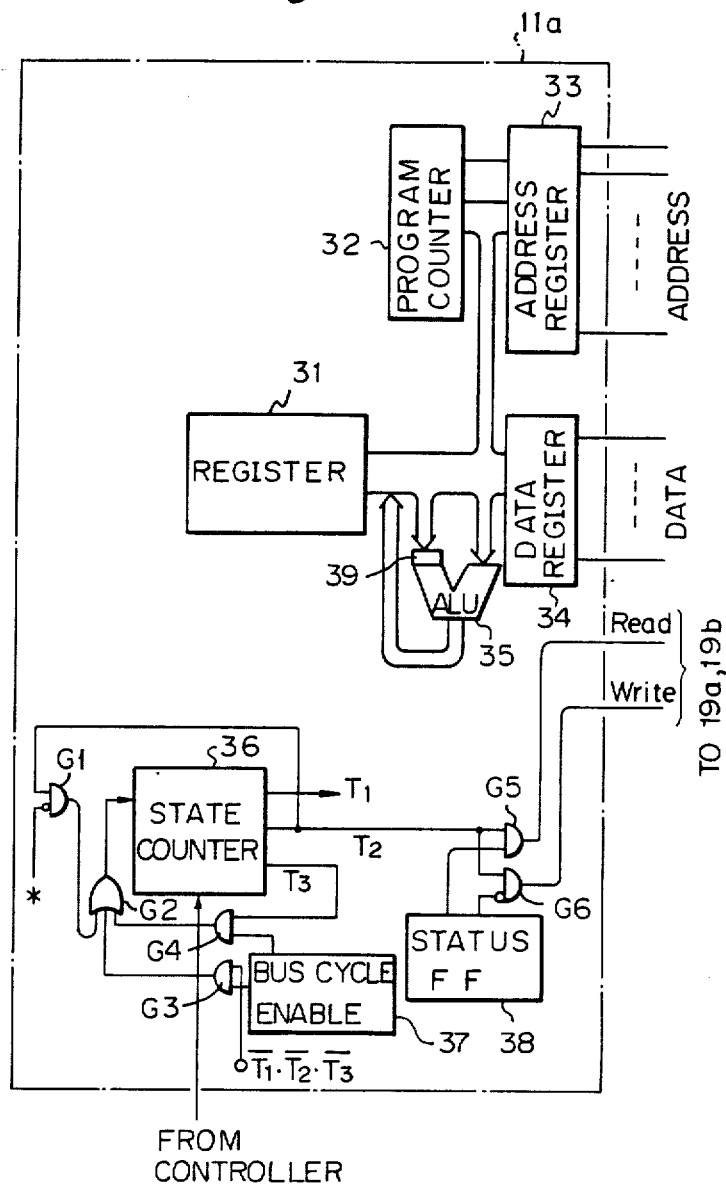
FIG. 4B is a block diagram showing an internal logic circuit shown in FIG. 4A.

FIG. 4B is a block diagram showing details of the internal logic circuit $11a$ shown in FIG. 4A. In FIG. 4B, 31 is a register, 32 a program counter, 33 an address register, 34 a data register, 35 an arithmetic unit, 36 a state counter, 37 a bus cycle enable flag register, and 38 a status flip-flop. In the circuit shown in FIG. 4B, address calculated from the content of the registers 31 and/or program counter is stored in the address register 33 and the content of the register 31 or output of the ALU is stored in the data register 34, and is output from the address register 33 and the data register 34 (write cycle). The characteristic feature of the circuit of FIG. 4B is the provision of a state counter 36, address register 33, and data register 34.

The state counter in FIG. 4B forms the timing signal $T_1 \sim T_3$ which is used for the state transition shown in FIG. 4C. The timing signals $T_1 \sim T_3$ shown in FIG. 4B correspond to the basic cycle shown in FIG. 4C, and $T_I$ is same as in FIG. 3B. The differences between FIG. 4C and FIG. 3B are as follows. When the signal supplied to the CS terminal is low, that is, $\overline{CS}$ becomes high, which makes the outputs of the tristate output buffer circuits $17a \sim 17n$, $18a \sim 18m$, $19a$ and $19b$ to a high impedance state and forces the state counter 36 to loop at the state $T_2$, as shown in FIG. 4c. After $\overline{CS}$ becomes low, the bus cycle is backed from $T_2$ to $T_1$ ($T'_1$ in FIG. 2C) and is restarted from $T_1$.

This will be further explained with reference to FIGS. 4A and 4C. When the microprocessor in FIG. 4A is executing the bus cycle, if another microprocessor requires the use of the bus, the low level signal is supplied to the CS terminal shown in FIG. 4A. Then the output of the inverter 15 becomes a high level, the output of the gate 16 (the control input of the tristate buffer circuits $17 \sim 19$) also reaches a high level. As a result, even if during a bus cycle, the output of tristate circuits $17 \sim 19$ responds immediately to the low level signal in the CS terminal, and reaches a high impedance state. On the other hand, if the bus cycle is interrupted at $T_1$, the state counter advances internally to $T_2$ to become in a loop state. In the loop, the data and address of the interrupt cycle are held in the data register 34 and the address register 33, respectively Therefore, even if the bus cycle is interrupted, the data and address of the interrupt cycle are not lost.

When another microprocessor has finished using the bus, the input signal of CS terminal reaches a high level. As a result, $\overline{CS}$ reaches a low level, and the output of the gate 16 also reaches a low level. Therefore, the tristate output buffer $17 \sim 19$ is activated. At the same time, the state counter returns to the state $T_1$ in the basic cycle, and the interrupted bus cycle is reexecuted from the initial state. When the bus cycle is restarted, the address and the data, stored in the address register 33 and data register 34, of the interrupted cycle are output.

The state counter 36 in FIG. 4B is operated as shown below.

When the bus cycle enable is set (the output of the enable flag 37 is at a high level), when $T_3$ is placed at a high level, the output of $G_3$ also is at a high level, and this is returned to an input of the state counter via $G_2$. The state counter responds to the output of $G_2$, and this $G_2$ output is placed at the state $T_1$ of the basic cycle. Further, the signal $\overline{T_1}\overline{T_2}\cdot\overline{T_3}$ showing the state not belonging to the basic cycle $T_1$, $T_2$, $T_3$ (idle cycle $T_I$) is input to $G_3$. When the bus is in the enable state, the state counter transfers the output to the state $T_1$ of the basic cycle.

Further, when the state counter receives the signal from the controller 12a and remains (loops) in the state $T_2$ of the basic cycle, the signal * (refer to FIG. 4A) is at a high level, the output of $G_1$ is at a high level, and is supplied to the input of the state counter via $G_2$, and the output of the state counter is transfered to the state $T_1$ of the basic cycle.

Further, the status flip-flop 38 outputs a high level signal or low level signal in accordance with whether it is a read or write operation. When $T_2$ output from the state counter is high, in accordance of the output of the status flip flop, one of the outputs of $G_5$ or $G_6$ reaches a high level.

Figure 5A:
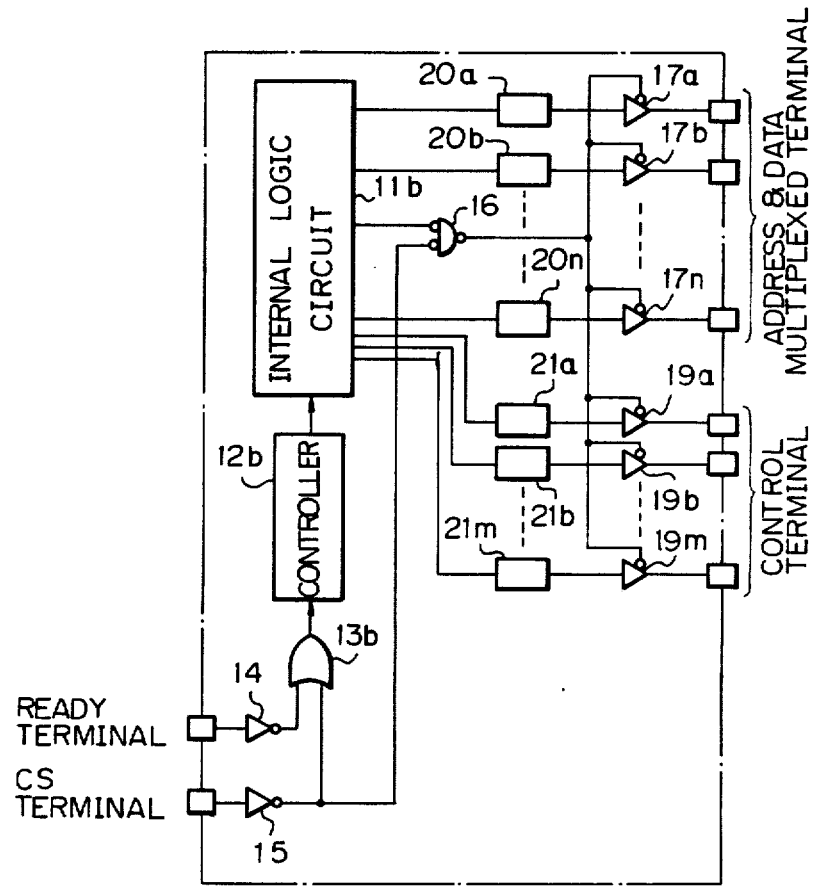
FIG. 5A is a block diagram showing a second embodiment of the present invention.

FIG. 5A shows a block diagram of the second embodiment of the present invention. In FIG. 5A, $11b$ is an internal logic circuit, 12 a control circuit, $13b$ a gate, 14 and 15 inverters, and 16 a gate. The other elements having the same symbol as those of FIG. 4A are the same elements as in the circuit shown in FIG. 4A.

Figure 5B:
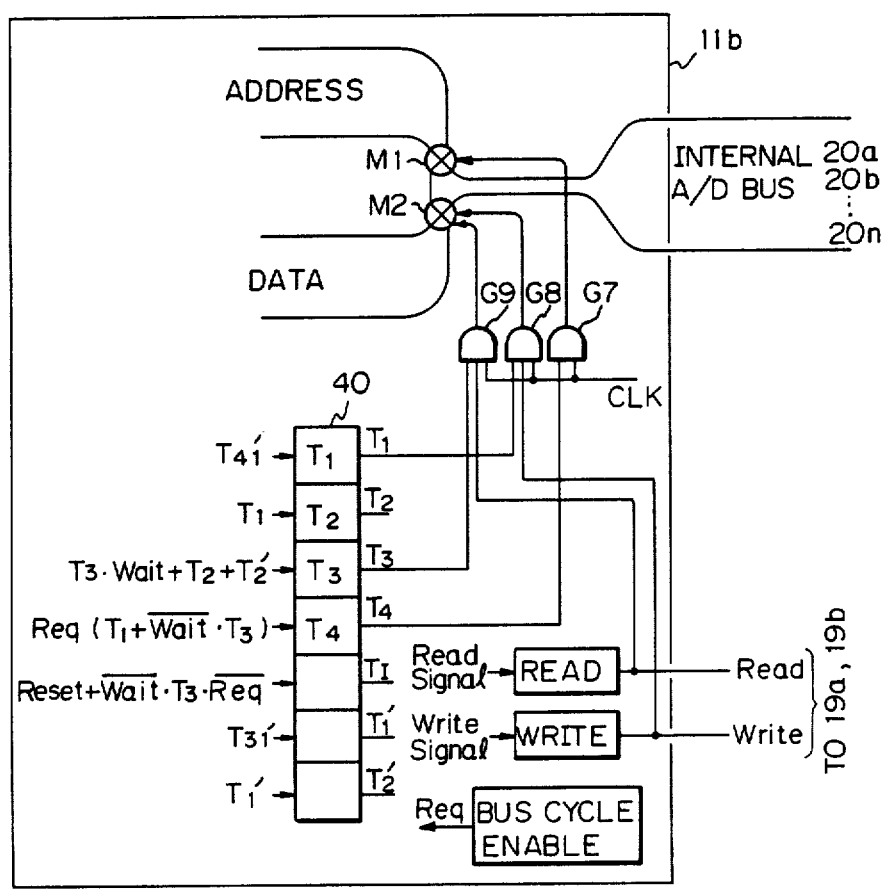
FIG. 5B is a block diagram showing an internal logic circuit shown in FIG. 5A, and FIGS. 5C and 5D are block diagrams showing registers shown in FIG. 5A.
Figure 9:
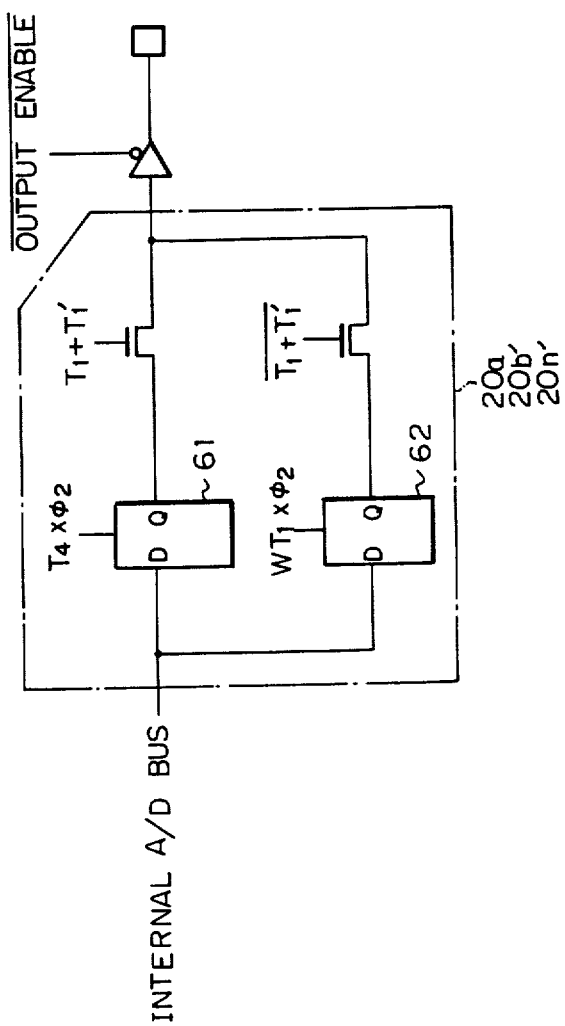
FIG. 9 is a block diagram showing the registers of the second embodiment of the present invention.

FIG. 5A shows the case of a time sharing bus wherein the bus is commonly used as a data bus and an address bus. This case requires registers $20a$, $20b$, ... $20n$, $21a$, $21b$, ... $21m$, in accordance with the status of the internal logic circuit. The register used in the present invention is shown in FIG. 5D. The register in FIG. 5C, conventionally used, is not suitable for the present invention, and the register shown in FIG. 9 is used as mentioned hereinafter. FIG. 5B is a block diagram showing details of the internal logic circuit $11b$ shown in FIG. 5. In FIG. 5B, 31, 34, 35, and 38 in FIG. 4B are omitted.

In FIG. 5B, $M_1$, $M_2$ are multiplexers and, in accordance with the output of $G_7 \sim G_9$, select the address or data and outputs it to an internal A/D bus. The internal A/D bus is connected to $20a\cdot20n$. Reference numeral 40 shows a tristate counter, which forms the signal for effecting the state transfer shown in FIG. 7B mentioned hereinafter.

In the drawing, the mark "+" shows a logical sum and the mark "·" shows a logical product. For example, $T_3\cdot\text{Wait}+T_2+T'_2$ means that the logically produced signal $T_3$ and the Wait signal are logically summed with the signal $T_2$ and the signal $T'_2$.

Further, the outputs $G_7 \sim G_9$ are input to the multiplexers $M_1$, $M_2$ as the control signal, synchronizing the output $T_1$, $T_3$, $T_4$ of the tristate counter 40 with the clock signal CLK.

Figure 6A:
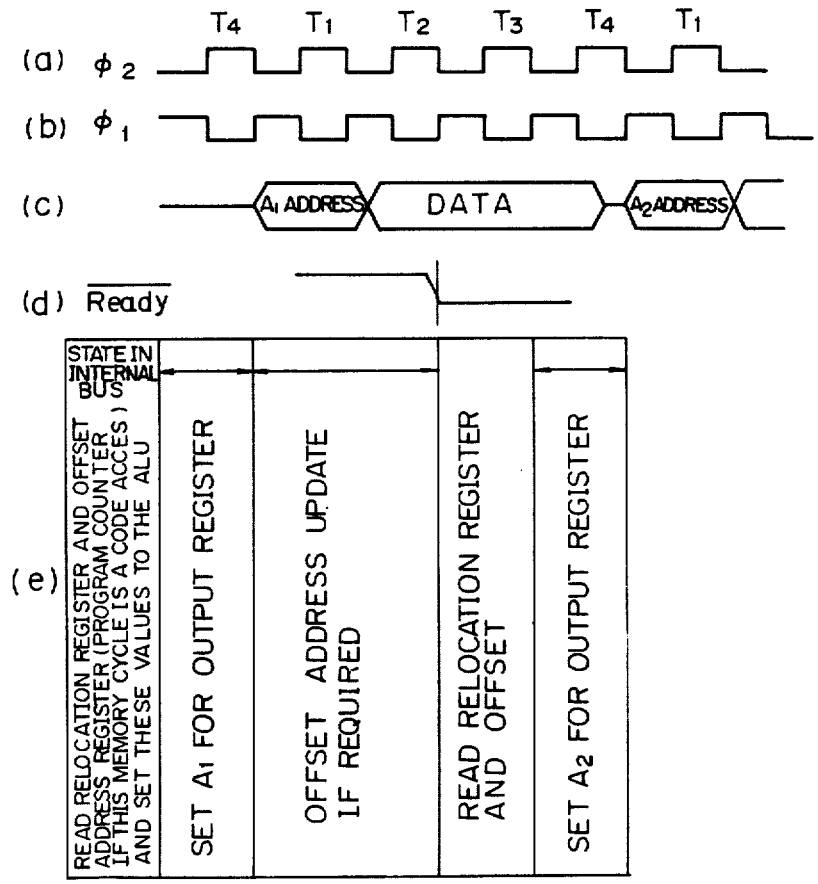
FIG. 6A is a time chart for explaining the operation of the circuit shown in FIG. 5A, and FIG. 6B a chart for explaining the operation of the circuit shown in FIG. 5A.
Figure 6B:
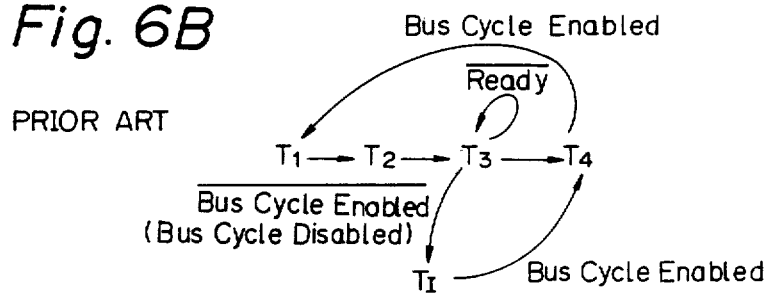

One cycle in two cycle pipeline of the conventional address data time sharing bus and a status diagram thereof are shown in FIGS. 6A and 6B. In FIG. 6A, $T_1\cdot T_4$ designate basic cycle, and $\phi_1$ and $\phi_2$ designate a clock cycle timing and one bus cycle is formed by the basic cycles $T_1$ to $T_4$. In FIG. 6A, (c) is a timing relating to the $A_1$ address, Data, and $A_2$ Address, (d) is a $\overline{\text{Ready}}$ signal, and (e) shows a state in the internal bus. In (e) of FIG. 6A, at the basic cycle $T_1$, the value of the program counter and the value $t_0$ be added to the value of the program counter are set in an adder. At the basic cycle of $T_2$, these two values are added and the result thereof is written in the program counter, at the end of $T_2$, the value of the program counter and the value of a relocation register are set in the adder, and at the timing $T_4$, the above two values are added and the result thereof is set in the output register (code access).

As shown in FIG. 6B, one bus cycle is formed by $T_1 \sim T_4$, and if the $\overline{\text{ready}}$ signal shown in FIG. 6A is high level, the bus cycle loops at the timing $T_3$. When the bus cycle starts from an idle state, the address is calculated at the timing $T_4$, the result thereof is loaded to the output register, the address is output and the data is loaded to the output register at the timing $T_1$, and the data is output at the timing $T_2$ (in the write cycle).

As shown in the figure, in the microprocessor which multiplexes the address and the data, after outputting the address at $T_1$, the calculation is made of the address which is to be next output. Therefore, in FIG. 6A, if the bus cycle is interrupted after the address A is output and is intended to be restarted, the address which is output at this time becomes $A_2$. Therefore, the bus is conventionally changed after the bus cycle is completed.

Figure 7A:
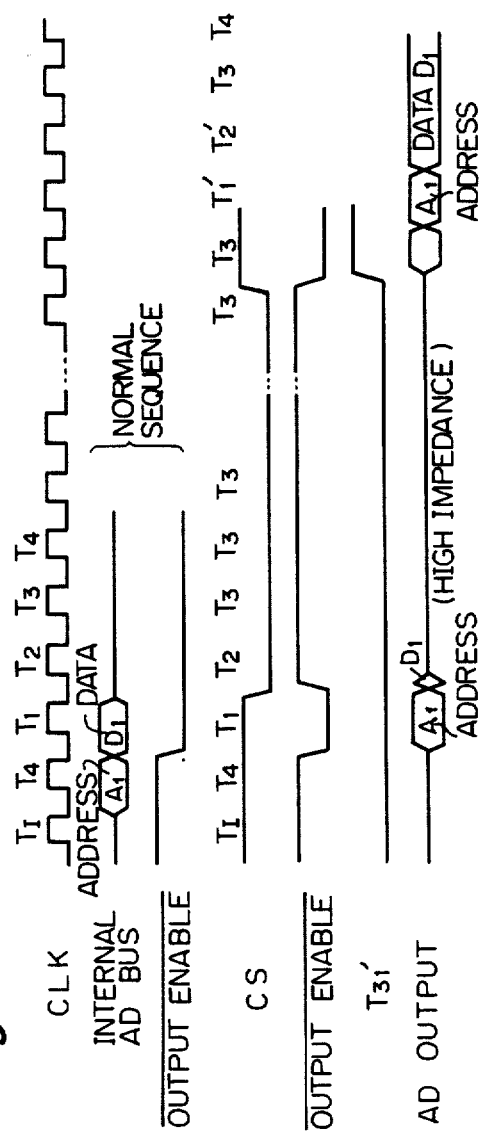
FIGS. 7A and 7B are a time chart and a chart for explaining the second embodiment of the circuit of the present invention shown in FIG. 5A.
Figure 7B:
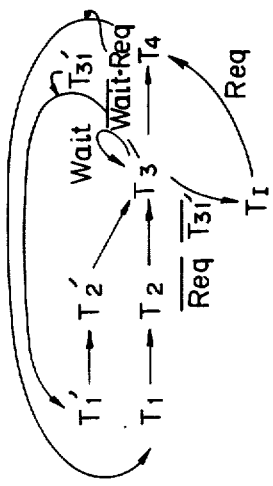

Therefore, in the present invention, for the purpose of removing the above-mentioned problem, the state counter of FIG. 5B is formed, so that the state transfer shown in FIG. 7B is carried out.

Figure 5C:
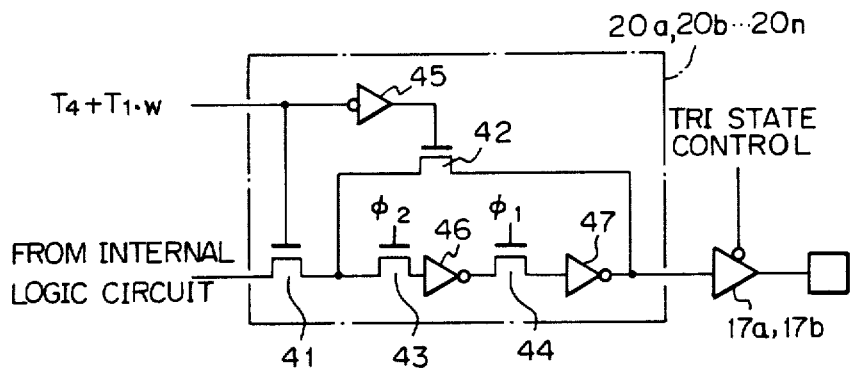
Figure 5D:
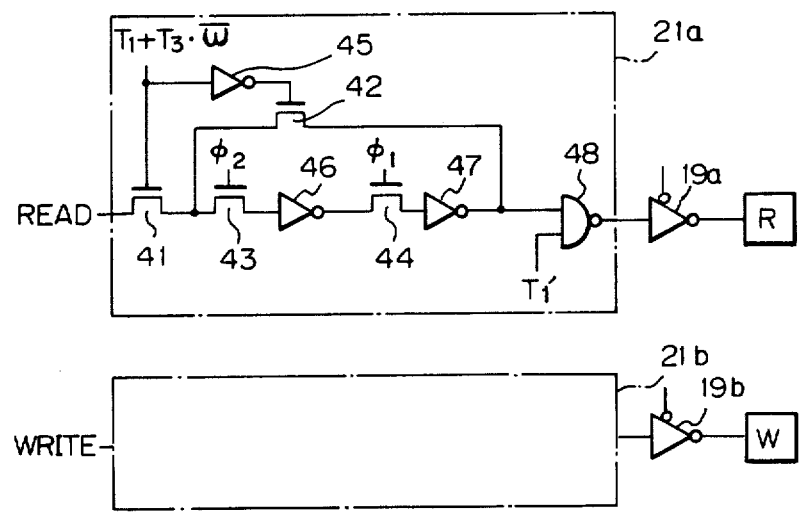

Further, in the embodiment shown in FIG. 4B, as the address and the data are output separately, the output register of each bit may be constructed as the circuit shown in FIG. 5C. In FIG. 5C, when the transistor 41 becomes ON, the data is input via the transistor 43, and at this time, the transistor 42 is in an OFF state. When the transistor 41 becomes OFF, the transistor 42 becomes ON the feedback loop is formed from the output of the logic gate 47 to the input of the transistor 43, and the latch is effected so that the data is held. However, in this case, only one of the addresses or the data is held. Therefore, in the present invention, as mentioned hereinafter, the output register is formed as shown in FIG. 9 so as to hold both the data and address.

This bus cycle is also realized by the circuit shown in FIG. 5D. In FIG. 5D, 41, 42, 43, and 44 designate field effect transistors (FET's), and 45, 46 and 47 designate inverters, respectively. An input signal $T_1 + T_3 \cdot \overline{W}$ the inverter 45 is supplied from a state counter in the internal logic circuit. In the input signal $T_4 + T_1 \times W$, W designates a write signal.

FIG. 7A designates a state cycle diagram in the embodiment of the address data time sharing bus according to the present invention, and FIG. 7B designates the state diagram thereof. In FIGS. 7A and 7B, the characteristic feature of the present invention is to provide timings $T'_1$, $T'_2$, and the relationship between these timings $T'_1$, $T'_2$ and the other timings $T_1 \sim T_4$ is formed by the state counter 40 in the internal logic circuit 11$b$ in FIG. 5. The circuit for forming the relationship between these timings will be explained by referring to FIGS. 8A and 8B.

Concerning FIG. 7A, in the normal sequence, at $T_4$, $A_1$ is output to the internal A/D bus, and is output externally at the following $T_1$. At this time, $D_1$ is output to the internal bus, and preparation is made to output $D_1$ externally. The signal $\overline{\text{OUTPUT ENABLE}}$ is low (enable state) at least until the time when the bus cycle is completed.

When CS becomes low during the bus cycle (that is, the request for use of the bus exists from another processor), in accordance with the fall time to low of the CS, if while $D_1$ is output the $\overline{\text{OUTPUT ENABLE}}$ signal becomes high (disable), the output AD OUTPUT reaches a high impedance state.

Further, when CS is at a low level, the state of the state counter advances to $T_2$, the address $A_1$, $D_1$ output in the internal bus is held in 20$a$18 20$n$ in FIG. 5A, and the state counter stops (i.e., loops) at $T_3$ as shown in FIG. 7B.

Thereafter, CS reaches a high level, and the $\overline{\text{OUTPUT ENABLE}}$ reaches a low level (enable), so that use of the external bus is possible. The state of the state counter is then transfered to $T'_1$, $T'_2$. The operation which is carried out in the basic cycle $T'_1$, $T'_2$ is the same as $T_1$, $T_2$, and the data and the address output at this time is the address A, and the data D held during CS is at a low level. Thus, the interrupted bus cycle is restarted from the beginning.

Figure 8A:
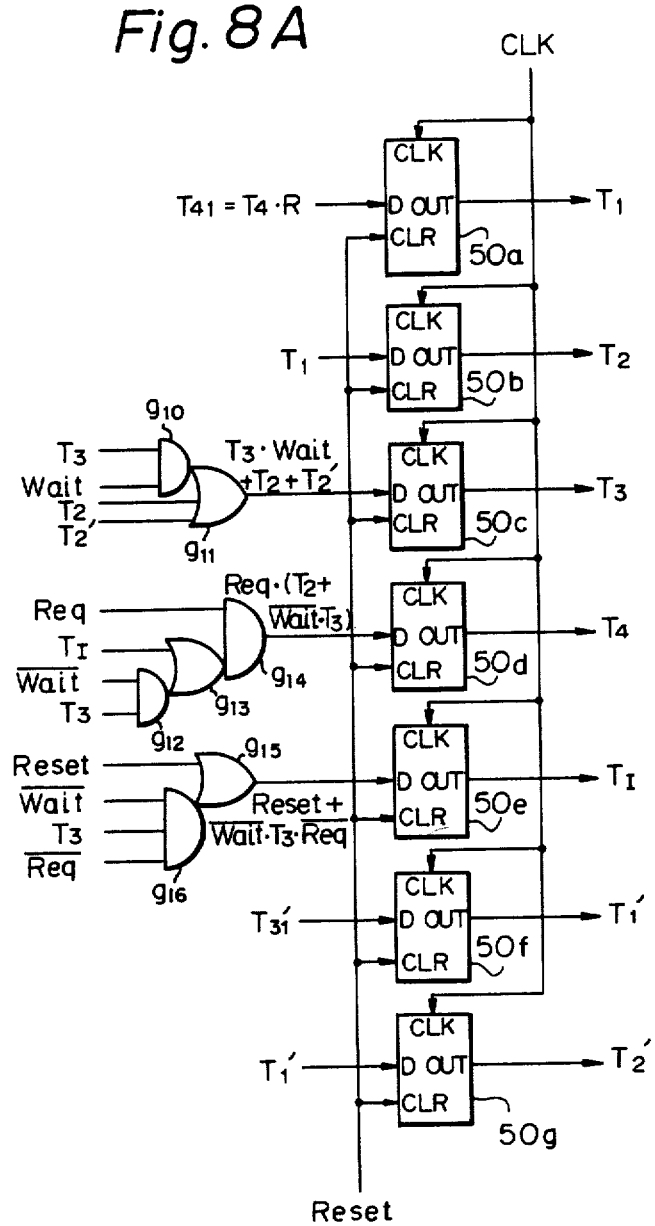
FIGS. 8A and 8B are block diagrams for forming the time relationship shown in FIG. 11.
Figure 8B:
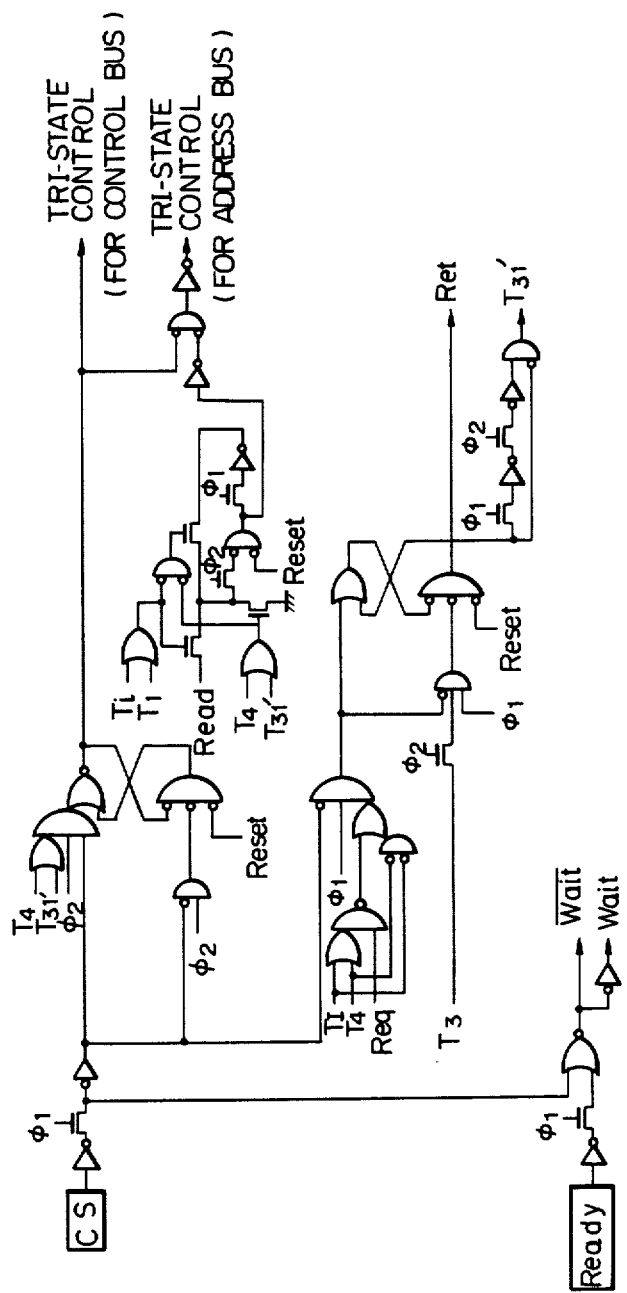

FIG. 8A is a detailed circuit of the state counter 40 in the internal circuit and FIG. 8B shows a 25 detailed circuit for obtaining the timing $T'_{31}$ and the three state control signal. In FIG. 8A, 50$a \sim$ 50$g$ designate a D type flip-flop circuit, $T_4 \cdot R$ designates a write at the timing $T_4$, and the timing $T_3$ is obtained in the circuit shown in FIG. 8B. The timing $T_1$, $T'_1$, and T4 in FIG. 8A are supplied to the registers 20$a \sim$20$n$ in FIG. 5A. The internal circuit of these registers is shown in FIG. 9.

In FIG. 8A, CLK is a clock input terminal, D is a data input terminal, and OUT is a data output terminal; $g_{10} \sim g_{16}$ is circuit for forming a logical signal by the logic of each input signal For example, $g_{10}$ effects a logical AND of $T_3$ and wait, and in $g_{10}$, the AND output of $g_{10}$, $T_2$ and $T'_2$ are logically OR ed.. As a result, the signal $T_3 \cdot \text{Wait} + T_2 + T'_2$ is output from $g_{11}$.

In FIG. 9, reference numerals 61, 62 represent D type flip-flops. The flip-flop 61 holds the address and the flip-flop 62 holds the write data $T_4 \times \phi_2$ is a clock signal for 61. Therefore, the address is supplied from the internal A/D bus to D·FF 61 synchronized with the clock $\phi_2$ in the basic cycle $T_4$. On the other hand, the write data is supplied from the internal A/D bus to D·FF 62 synchronized with the clock $\phi_2$ in the basic cycle $T_1$. Note, W is a write control signal.

On the other hand, the operation for outputting the held address data in 61 and 62 to the output buffer is carried out at the next timing.

The address held in the flip-flop 61 is output via the transfer gate to the output buffer at the basic cycle $T_1$ or $T'_1$. The data held in the flip-flop 62 is output via the transfer gate at the basic cycle except for $T_1$ and $T'_1$.

Figure 10:
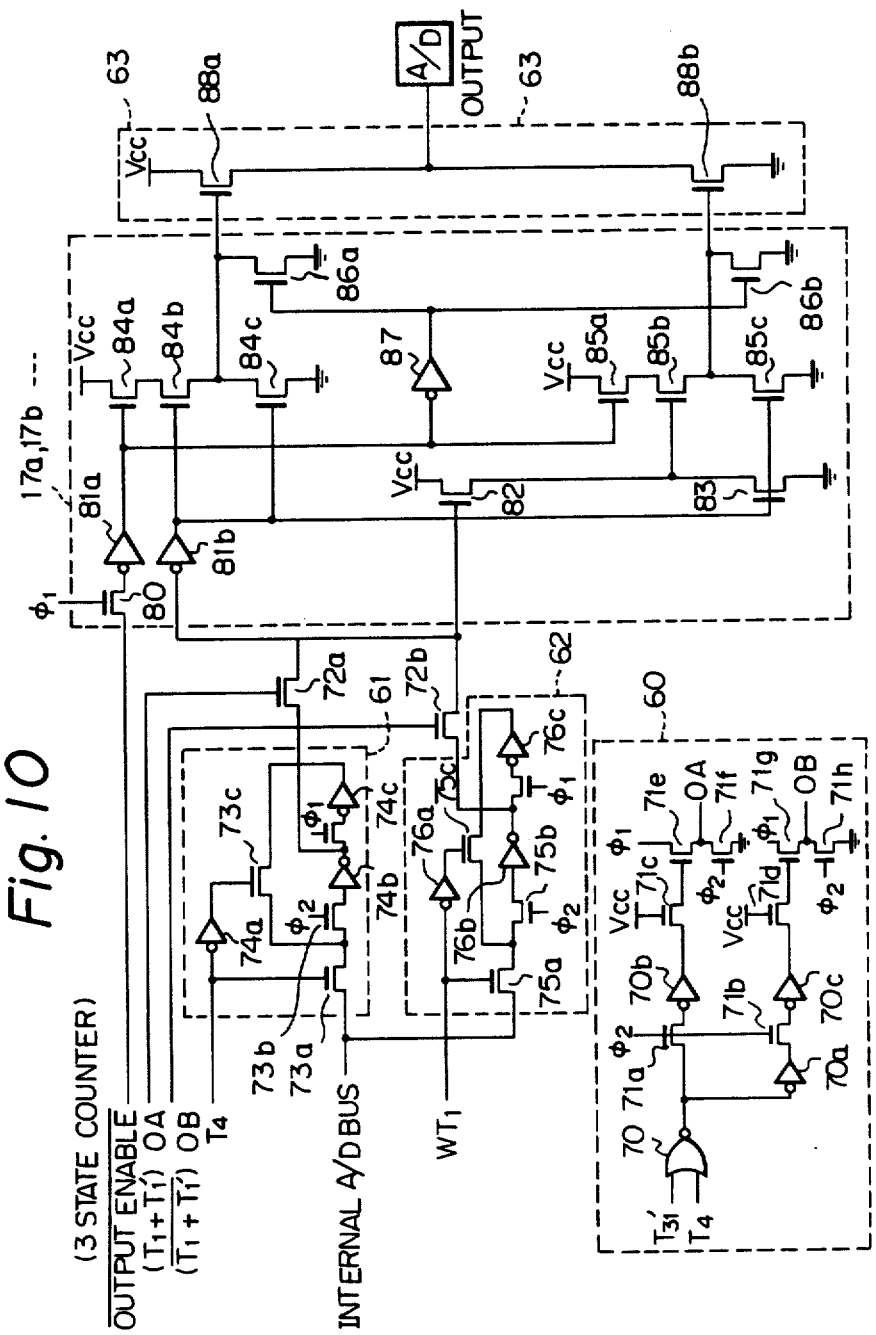
FIG. 10 is a detailed circuit diagram of the registers shown in FIG. 9.

FIG. 10 is a concrete embodiment of the circuit including the registers in FIG. 9, the tristate output buffer circuits 17$a$, 17$b$, ..., and an output buffer 63. In FIG. 10, circuit 60 is a control circuit driven by a state counter included in the internal logic circuit. This circuit 60 includes a gate 70, inverters 70$a$, 70$b$, and 70$c$, FET's 71$a$, 71$b$, 71$c$, 71$d$, 71$e$, 71$f$, 71$g$, and 71$h$, and the output thereof is supplied to gate circuits 72$a$, 72$b$ of the register. The FET circuit 61 includes FET's 73$a$, 73$b$, and 73$c$, and inverters 74$a$, 74$b$, and 74$c$, and the FF circuit 62 included FET's 75$a$, 75$b$, and 75$c$ and inverters 76$a$, 76$b$, and 76$c$.

The tristate gate circuits 17$a$, 17$b$, ... include an FET 80, inverters 81$a$, 81$b$, FET's 82, 83, 84$a \sim$84$c$, 85$a \sim$85$c$, 86$a$ and 86$b$, and an inverter 87. When an $\overline{\text{OUTPUT ENABLE}}$ signal high is supplied to the circuits 17$a$, 17$b$, ..., the transistor 80 is placed in an ON state, the input level of the inverter is at a high level and the output level of the inverter is at a low level, so that the output of the inverter 87 is at a high level. Therefore, the drain of the transistors 86$a$, 86$b$ is at a low level, and the output of the output buffer 63 is at a high impedance state.

The timing charts practically measured in the system according to the present invention are shown in FIG. 11A and 11B. In FIG. 11A, (a) shows a clock cycle actually at the timing $\phi_2$, (b) shows a chip enable signal, (c) shows a wait signal, and (d) is a three state control signal generated in the circuit shown in FIG. 8. Further, (e) is a signal in the write cycle in an A/D bus, (f) is a request signal, that is, a bus cycle request signal, generated for commencing the instruction fetch or by an execution of the instruction. One request signal sometimes generates several bus cycles, and is at an active high level during bus cycle caused by the request, and is at a low level at the timing $T_1$ of the last bus cycle. In FIG. 11A, (g) is a retry signal and (h) is the signal $T_{31}'$ generated in the circuit shown in FIG. 8B.

In FIG. 1B, (i) shows the timing $T_4$, and (j) and (k) are signals OA and OB, respectively, which are the outputs of the control circuit 60 shown in FIG. 10.

As explained in detail above, in the present invention, when the external device requiring the bus is allowed to use the bus, the processor makes the necessary signal to a high impedance, and when the input signal returns to an active state, the processor completes the bus cycle. This is very effective when the processor receives a bus request requiring a high priority and a rapid response, and the means for rapidly exchanging the bus is provided. Further, in the simple system, a simple and clear bus exchanging means is provided so that the size of the logic circuit can be reduced.

The present invention is especially effective, when the data is output by dividing the data at a bus having a restricted data width, for example, data of 16 bits, 32 bits is output to an 8 bit bus by diving it twice or 4 times. That is, in the conventional method, the change of the bus access right must wait until the time when two bus cycles or four bus cycles are completed. However, in the present invention, this necessity can be eliminated.

I claim:

1. A microprocessor connectable to an external device via an external bus, said microprocessor comprising:

an internal logic circuit controlling a bus cycle to communicate with the external device, the bus cycle being composed of a plurality of basic cycles, information output by said internal logic circuit being output in at least one of the basic cycles;

a plurality of buffer circuits connected to said internal logic circuit, said buffer circuits outputting the information to the external bus;

interrupting means connected to said buffer circuits, said interrupting means for immediately interrupting the bus cycle in response to an external control signal, said interrupting means causing outputs of said buffer circuits to be in a high impedance state which causes said microprocessor to abandon a bus access right even if the bus cycle is not completed.

holding means connected to said internal logic circuit, said holding means for holding the information provided by said internal logic circuit when the external control signal is received; and resuming means for resuming the interrupted bus cycle by obtaining the bus access right for the microprocessor in response to a release of the external control signal, the interrupted bus cycle being resumed by reinitiating the basic cycle that was being processed when the external control signal was received using the information held in said holding means.

2. A microprocessor according to claim 1, wherein said information is composed of an address and data.

3. A microprocessor according to claim 2, wherein said holding means comprises an address register for storing the address of said information and a data register for storing the data of said information, and said internal logic circuit comprises calculating means for calculating a next address for the next output information.

4. A microprocessor according to claim 2, wherein the basic cycles are composed of a first basic cycle for calculating the address and a second basic cycle for outputting the address and the data, and a third basic cycle for a read or a write operation.

5. A microprocessor according to claim 1, wherein said internal logic circuit comprises a state counter for generating timing signals to define the basic cycles, the state counter being stopped when the control signal is received and said state counter generating the timing signals to reexecute the interrupted bus cycle when the control signal is released.

6. A microprocessor according to claim 2, wherein said internal logic circuit comprises a multiplexing means for multiplexing the data and the address, and the basic cycles are composed of a first basic cycle for outputting the address and a second cycle for outputting the data.

7. A microprocessor according to claim 6, wherein said resuming means resumes the bus cycle from the first basic cycle regardless of a timing at which the control signal is received.

* * * * *